United States Patent
Park

(10) Patent No.: US 7,050,444 B2
(45) Date of Patent: May 23, 2006

(54) MODEM AND METHOD OF PROCESSING DATA

(75) Inventor: Chang-Hawn Park, Kyungki-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 872 days.

(21) Appl. No.: 09/907,504

(22) Filed: Jul. 18, 2001

(65) Prior Publication Data

US 2002/0021702 A1 Feb. 21, 2002

(30) Foreign Application Priority Data

Aug. 7, 2000 (KR) ................. 2000-45738

(51) Int. Cl.
*H04L 12/28* (2006.01)
(52) U.S. Cl. ............... 370/401; 370/469; 375/222
(58) Field of Classification Search .......... 370/352, 370/355, 465–466, 469, 401; 375/222
See application file for complete search history.

(56) References Cited

U.S. PATENT DOCUMENTS

| | | | |
|---|---|---|---|
| 5,500,860 A * | 3/1996 | Perlman et al. | 370/401 |
| 6,023,724 A | 2/2000 | Bhatia et al. | |
| 6,049,531 A * | 4/2000 | Roy | 370/395.53 |
| 6,101,182 A * | 8/2000 | Sistanizadeh et al. | 370/352 |
| 6,108,350 A * | 8/2000 | Araujo et al. | 370/467 |
| 6,452,925 B1 * | 9/2002 | Sistanizadeh et al. | 370/352 |

FOREIGN PATENT DOCUMENTS

EP 0 713 310 A2 5/1996

OTHER PUBLICATIONS

Citation 1, ISDN, INTERNET magazine, Aug. 1, 1999, No. 55, p. 284-293.
Citation 2, ADSL, Ethernet, ATM, Nov. 18, 1996, No. 676, p. 97-103.
Efficient Networks et al:, "SpeedStream 5600 ADSL Router Installation Guide", ADSL Router Installation Guide, 1999, XP002189944.

* cited by examiner

*Primary Examiner*—Ricky Q. Ngo
*Assistant Examiner*—Nittaya Juntima
(74) *Attorney, Agent, or Firm*—Sughrue Mion, PLLC

(57) ABSTRACT

A modem and a method of processing data thereof. The modem includes a first interface interfacing with a subscriber terminal, a second interface interfacing with an Asynchronous Mode Transfer switching system, a memory device supporting various communication protocols, and a control unit processing two-way data communication between the subscriber terminal and the Asynchronous Transfer Mode switching system. The control unit further includes a mode selecting section reading a data packet received from the first interface, and a data processing section processing data. The modem and the method of processing data thereof according to the present invention provides response information of the modem through the subscriber terminal, corresponding to the application service such as embedded web or telnet having a destination address that corresponds to the modem, by using a Transmission Control Protocol/Internet Protocol familiar to general users.

7 Claims, 5 Drawing Sheets

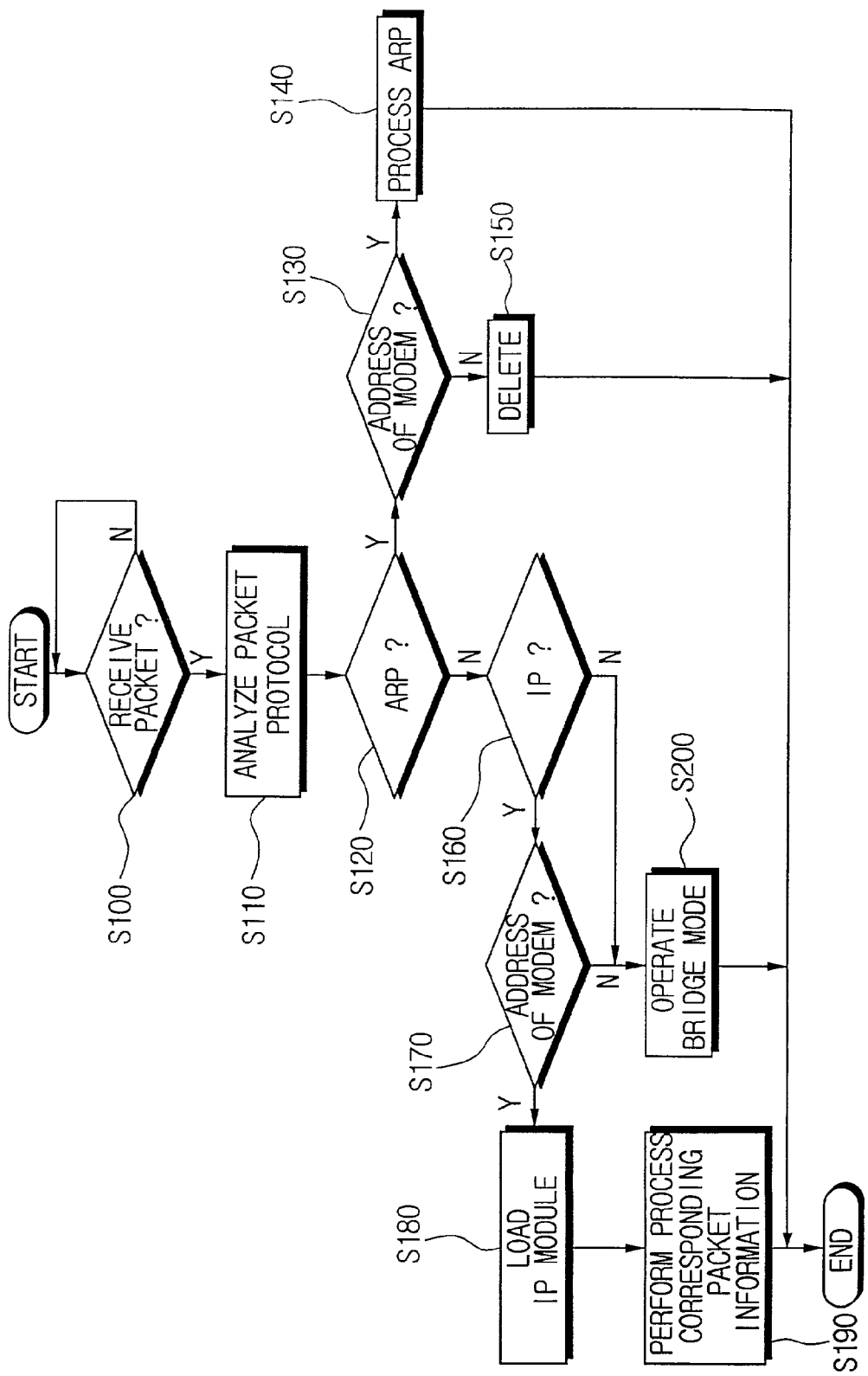

MODEM AND METHOD OF PROCESSING DATA

BACKGROUND OF THE INVENTION

1. Field of the Invention

The present invention relates to a modem and a method of processing data, and more particularly to a modem installed between a subscriber terminal and a switching system, for processing a received data packet.

The present application is based on Korean Patent Application No. 2000-45738, filed Aug. 7, 2000, which is incorporated herein by reference.

2. Description of the Related Art

Various related art network communication service technologies are available to general users for providing high-speed communication services. Among the related art technologies, an Asymmetric Digital Subscriber Line (ADSL) is widely used due to a high-speed data transmission via existing telephone lines. The related art ADSL service provides a maximum 8 Mbps downstream rate and a maximum 1 Mpbs upstream rate.

Major parts of the related art ADSL service system include a central service part (e.g., a central telephone office for managing telephone lines concentrated to the central service part), a subscriber service part, and a connecting part for connecting the central service part to a data backbone.

FIG. 1 is a block diagram showing a related art ATM switching system connected to a subscriber terminal through the ADSL modem in a general ADSL communication service system. The subscriber terminal 10 is connected to a Network Access Server (NAS) 40 through an ADSL Terminal Unit-Remote (ATU-R) 20, and a Digital Subscriber Line Access Multiplexer (DSLAM) 30.

The DSLAM 30 is the ATM switching system unit (i.e., the central service part), and includes an ADSL Terminal Unit-Center (ATU-C) and an ATM switch. The ATU-R 20 is the ADSL modem (i.e., the subscriber service part), connecting the DSLAM 30 and the subscriber terminal 10. The ATU-R 20 is generally called a Customer Premise Equipment (CPE).

The ATU-R 20 as a related art subscriber modem performs either in a router mode or a bridge mode which is recommended in a Request for Comments (RFC) 1483, for processing two-way data transmission/reception between the subscriber terminal 10 and a remote area network. The RFC is TCP/IP specification or service standard disclosed through a server on the Internet with an address of (http://ds.internic.net/) by the IETF (Internet Engineering Task Force), an Internet Research and Development Institute. Each RFC has a serial number assigned thereto for identification of the contents of the RFC.

The ATU-R 20 operating in the router mode processes received data with a support of an Internet Protocol (IP) module such that the IP module that supports a Transmission Control Protocol/Internet Protocol (TCP/IP) based service is layered on an execute protocol stack.

The ATU-R 20 operating in the bridge mode processes data at an interface between the subscriber terminal 10 and the DSLAM 30. The IP module is not layered on the execute protocol stack of the ATU-R 20 when operating in the bridge mode.

However, the related art ASDL service system has various problems and disadvantages. For example but not by way of limitation, as shown in FIG. 2, since the ATU-R 20 operating in the bridge mode does not have the IP module, status information of the ATU-R 20 (e.g., a data processing speed thereof) cannot be obtained by a user even though the user executes application programs (e.g., telnet and embedded web) installed in the subscriber terminal 10. While the status information of the related art ATU-R 20 operating in the bridge mode may be obtained through a RS-232 console or a special method supported by a Central Processing Unit (CPU) of the ATU-R 20, such related art methods require professional skills of an ATU-R developer. As a result, general users are unable to easily use the related art ASDL service system.

SUMMARY OF THE INVENTION

The present invention solves at least the above-mentioned problems and disadvantages of the related art, and accordingly, it is an object of the present invention to provide a modem and a method of processing data thereof that enables general users to easily obtain status information of a subscriber modem and provides a bridge function.

In order to achieve the above object, a modem according to the present invention comprises, a first interface for interfacing with a subscriber terminal, a second interface for interfacing with a switching system, a memory device in which a module is stored, for supporting various communication protocols, and a control unit for processing bidirectional data communication between the subscriber terminal and the switching system. The control unit comprises a mode selecting part reading a data packet received from the first interface, and determining according to a result from the reading, whether to load or unload an Internet Protocol module on an execute protocol stack for processing the received data packet, and a data processing part for processing data corresponding to the data packet received from the loaded protocol module on the protocol stack according to a mode determined by the mode selecting part.

It is preferable that the first interface is an Ethernet interface, and the mode selecting part loads the Internet Protocol module on the protocol stack, when the Internet Protocol address of the modem used in an internal network between the subscriber terminal and the modem, is recorded in the data packet which is received from the Ethernet interface, and when an information is requested for a Transmission Control Protocol/Internet Protocol based application, which can be supported by the modem.

The mode selecting part unloads the Internet Protocol module for allowing bridge mode operation when a destination address recorded in the data packet received from the first interface is not an address of the modem.

The information requesting the Transmission Control Protocol/Internet Protocol based application service includes at least one service among a telnet, an embedded web, a ftp, a tftp, and a ping.

A method of processing data in a modem installed between a subscriber terminal and a switching system comprises the steps of i) analyzing a data packet received from the subscriber terminal, ii) loading an Internet Protocol module on an execute protocol stack for processing received data packet, when an Internet Protocol address of the modem used in an internal network between the modem and the subscriber terminal, is recorded in the data packet, and when an information is requested for a Transmission Control Protocol/Internet Protocol based application service, and iii) processing the data packet information with a support of the Internet Protocol module.

It is preferable that the method of processing data in the modem further comprises the step of iv) transforming the data packet to a format required by a switching system through a second interface in a bridge mode in which the Internet Protocol module is unloaded on the protocol stack, when an Internet Protocol address of the modem used in the internal network between the subscriber terminal and the modem is not recorded in the data packet.

BRIEF DESCRIPTION OF THE DRAWINGS

These and other objects and advantages of the invention will become apparent and more readily appreciated from the following description of the accompanying drawings in which:

FIG. 5 is a flow chart showing a mode determining process and a data processing based on the determined mode according to the preferred embodiment of the present invention.

DETAILED DESCRIPTION OF THE PREFERRED EMBODIMENT

Hereinafter, a modem and a method of processing data thereof according to the preferred embodiment of the present invention will be described in detail with reference to the accompanying drawings.

Figure 1:
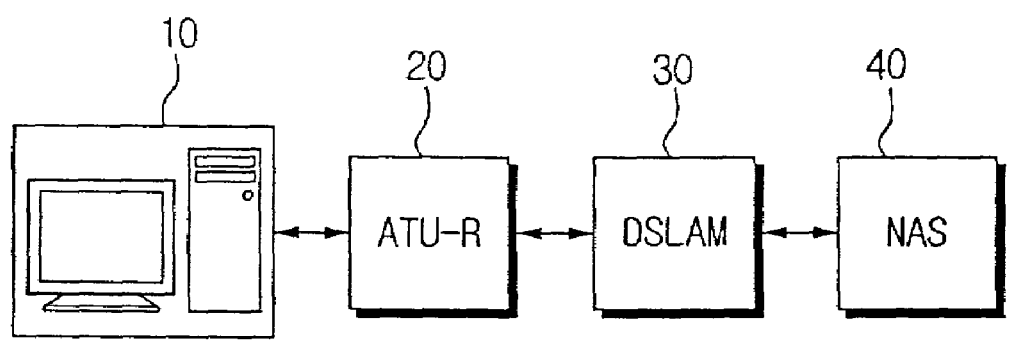
FIG. 1 is a block diagram showing the connection of a subscriber terminal and an ATM switching system through an ADSL modem in a related art ADSL communication service system.
Figure 2:
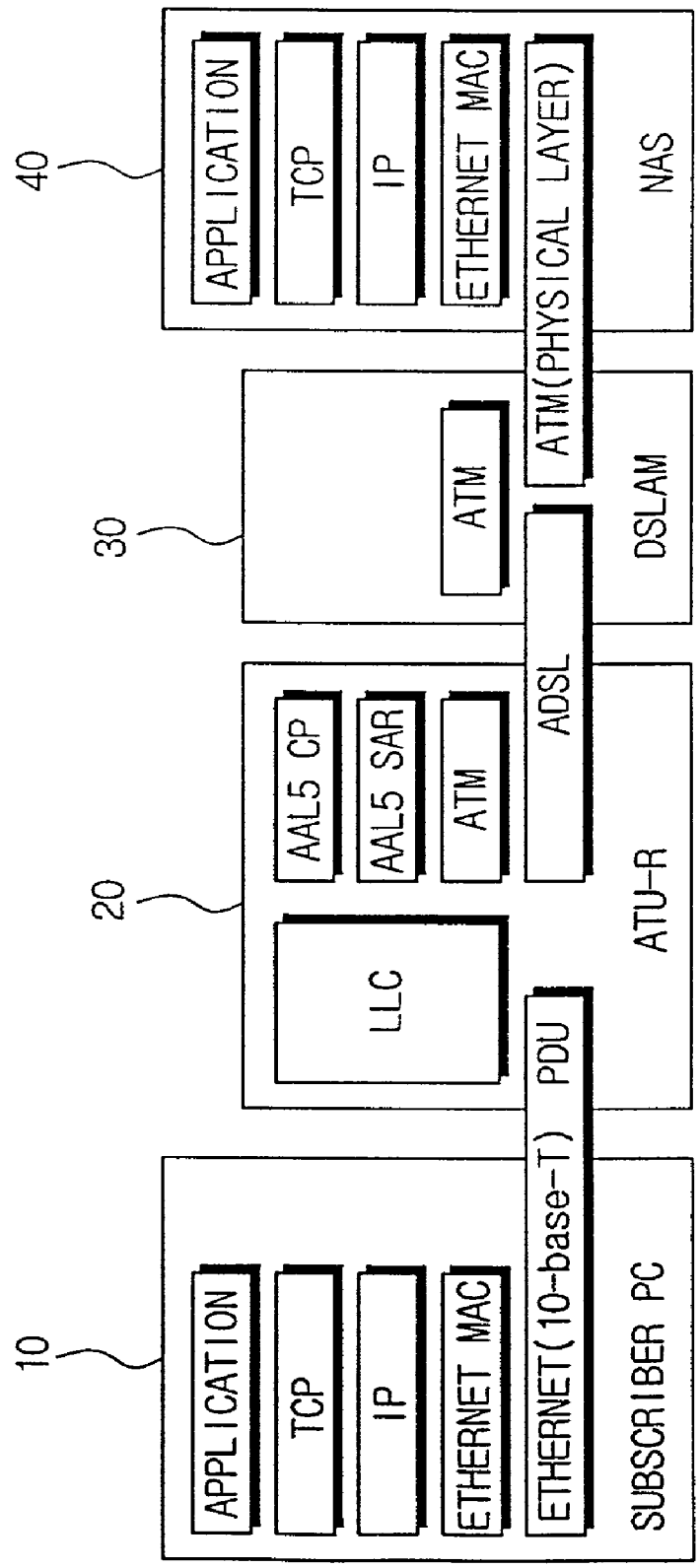
FIG. 2 is a block diagram showing an operation of a related art ADSL modem in a bridge mode of FIG. 1.
Figure 3:
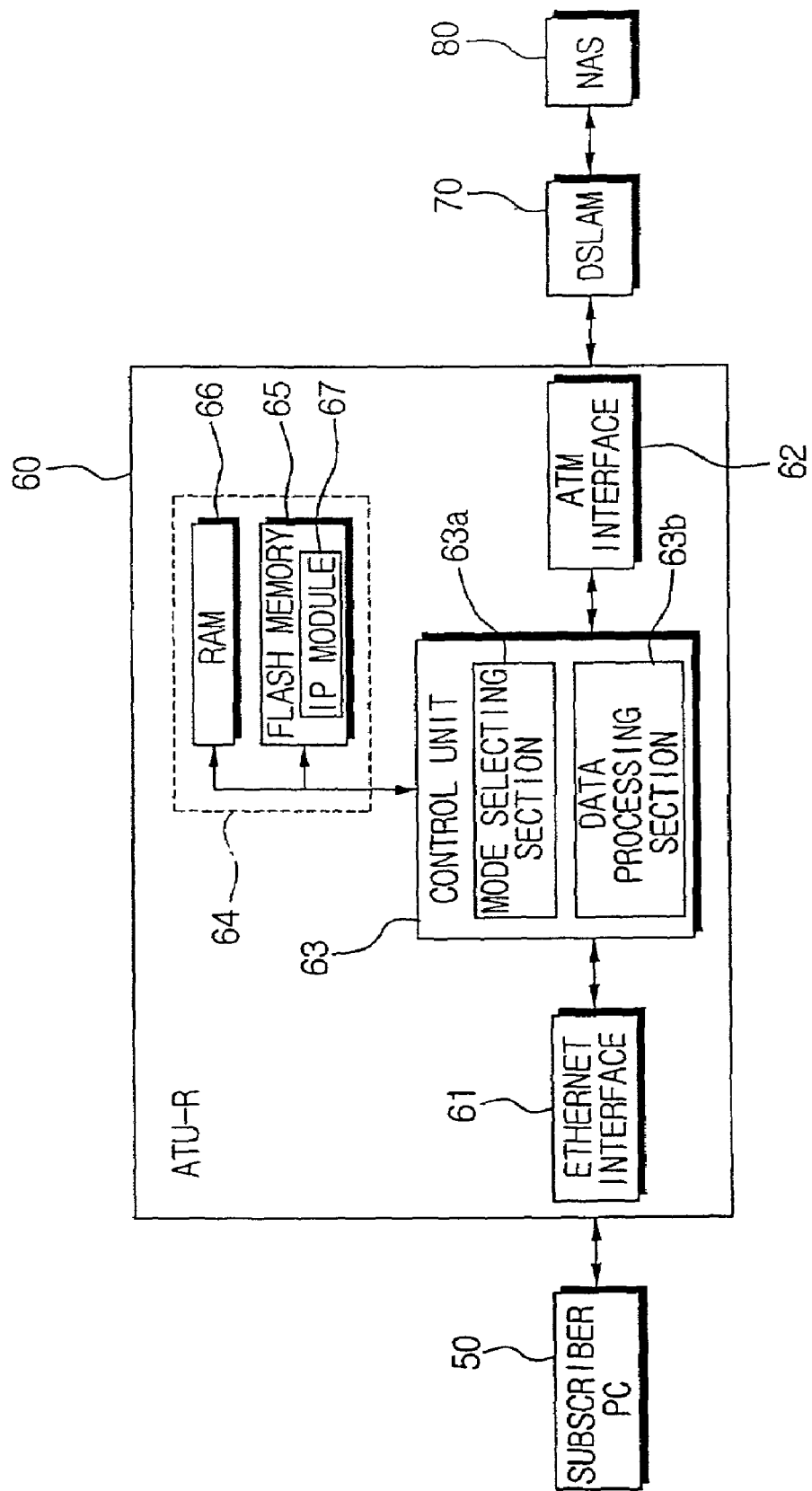
FIG. 3 is a block diagram showing an ADSL modem according to the preferred embodiment of the present invention.

FIG. 3 is a block diagram showing an ADSL modem according to the preferred embodiment of the present invention. An ATU-R 60 is coupled between a subscriber terminal (e.g., Personal Computer (PC) 50) and a DSLAM 70. The DSLAM 70 is coupled to a Network Access Server (NAS) 80.

The subscriber modem ATU-R 60 includes an Ethernet interface 61 coupled to the subscriber PC 50, an ATM interface 62 coupled to the DSLAM 70, a memory device 64, and a control unit 63 coupled between the Ethernet interface 61 and the ATM interface 62. The Ethernet interface 61 is a first interface that transmits/receives data packets with the subscriber terminal 50, and the ATM interface 62 is a second interface that transmits/receives an ATM cell stream to/from the DSLAM 70, respectively, which is a switching system unit.

In the memory device 64, various programs for supporting bidirectional communication (e.g., a booting program and an application program) are stored. The memory device 64 also stores an Internet Protocol (IP) module 67 in a flash memory 65 that is executed in an application service support mode in which TCP/IP based application service for the ATU-R 60 is available on demand.

The memory device 64 includes one or a plurality of memories. In the preferred embodiment of the present invention, the memory device 64 includes a flash memory 65 that includes the booting and application programs, and a Random Access Memory (RAM) 66 that temporarily stores data.

The control unit 63 analyzes and processes data received from the Ethernet interface 61 or ATM interface 62 and includes a mode selecting section 63*a* and a data processing section 63*b*. The mode selecting section 63*a* reads a data packet received from the Ethernet interface 61, and according to a result of the reading, determines whether to load or unload the IP module 67 on an execute protocol stack for processing received data packet. The data processing section 63*b* processes the received data packet by the protocol module which is loaded on the execute protocol stack according to the mode determined by the mode selecting section 63*a*.

The control unit 63 stores an internal IP address of the ATU-R 60 allocated by the subscriber terminal 50 a memory device 64. The internal IP address of ATU-R 60 is allocated by the subscriber terminal 50 used in an internal network to identify a modem between the subscriber terminal 50 and the ATU-R 60. In the preferred embodiment of the present invention, the IP address allocated by the subscriber terminal 50 to the ATU-R 60 is different from the internet IP address allocated for use in an external network that includes the NAS 80 coupled to the ATM interface 62 as a second interface and an Internet (not shown).

The mode selecting section 63*a* selects between a bridge mode without the IP module support, and an application service mode with the IP module support, according to data packet information received from the Ethernet interface 61. The mode selecting section 63*a* loads the IP module on the execute protocol stack for processing data when the IP address of the ATU-R 60 allocated by the subscriber terminal 50 for the internal network is recorded in the data packet which is received from the Ethernet interface 61, and when a request for the TCP/IP based application is made that can be supported by the ATU-R 60. In other cases, the mode selecting section 63*a* unloads the IP module 67 to prevent the control unit 63 from using the IP module. In this case, the information requesting the TCP/IP based application service includes at least one service among a telnet, an embedded web, a ftp, a tftp, and a ping, which are familiar to general users.

In the application service mode, the IP module 67 is loaded, and in the bridge mode for which the Request For Comments (RFC) 1483 recommends, the IP module 67 is not loaded.

In the preferred embodiment of the present invention, in the application service mode, only the IP module 67 is additionally loaded on the stack of various execute protocols to support the bridge mode.

The data processing section 63*b* processes received data packet according to a mode determined by the mode selecting section 63*a*, either as a bridge mode or an application service mode.

Figure 4:
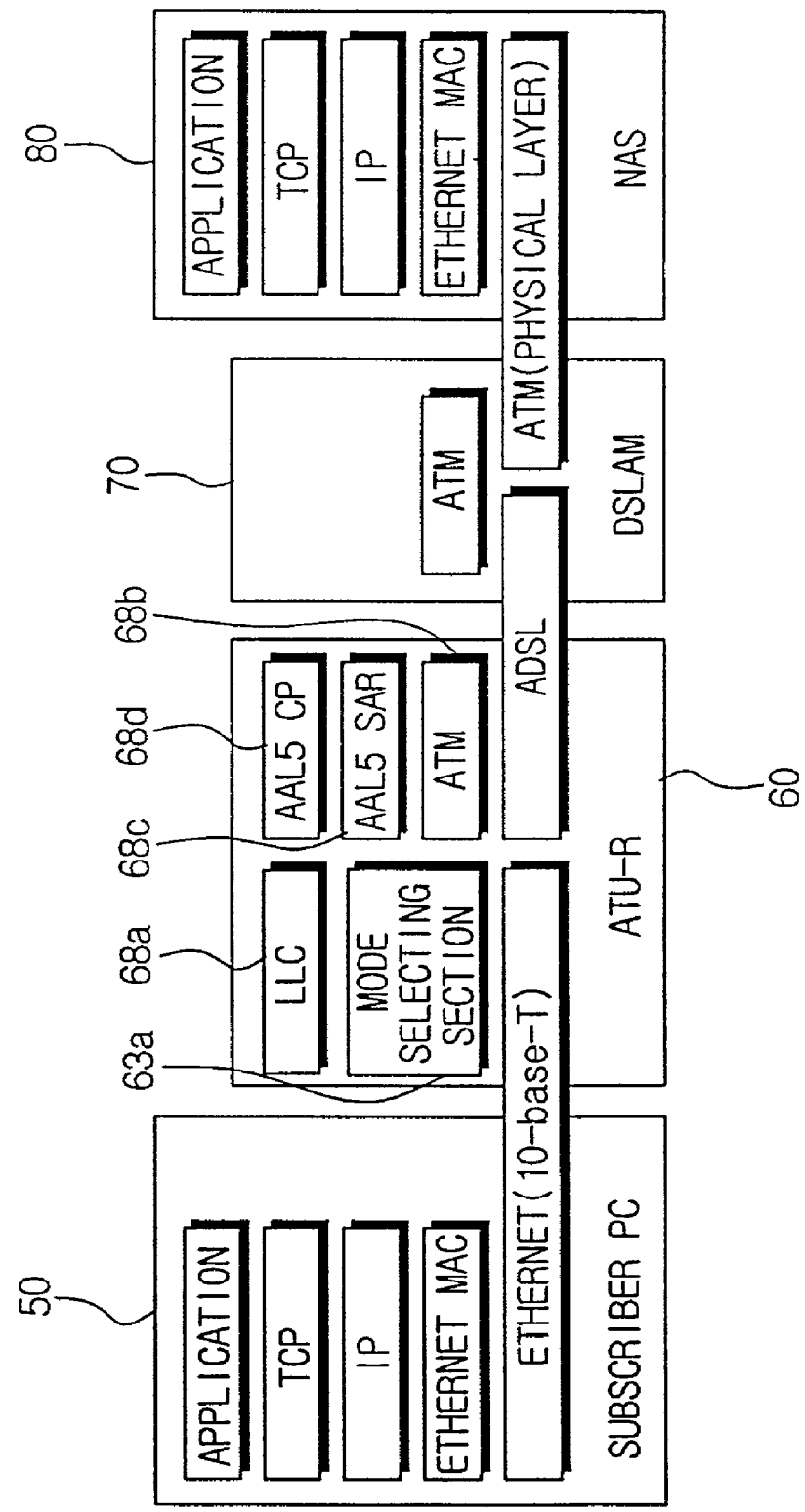
FIG. 4 is a block diagram showing an operation of an ADSL modem which supports a multi-operation mode in the communication service system according to the preferred embodiment of the present invention.

FIG. 4 is a diagram showing a structure of the major layers of execute protocol stack of the ATU-R 60, which supports a multi-operation mode. The mode selecting section 63*a* is layered on the Ethernet layer among physical layers of the ATU-R 60 (i.e., the ADSL and the Ethernet (e.g., 10 base T)). Various protocol modules (Logical Link Control (LLC) 68*a*, ATM 68*b*, ATM Adaptation Layer 5 Segmentation And Reassembly (AAL5 SAR) 68*c*, and ATM Adaptation Layer 5 Convergence Protocol (AAL 5 CP) 68*d*) are layered to support ADSL service in the related art bridge mode.

The LLC 68*a* is a data link control protocol layer used in a token ring, and the ATM 68*b* is a switching protocol layer transmitting the ATM cell. Further, the AAL5 SAR 63*c* is a SAR sub layer protocol that contains upper layer information in a 48-byte segment transmitted as the ATM cell based on a fifth sub protocol of the AAL. In the preferred embodiment of the present invention, the fifth sub protocol of the AAL for the ATM cell data format supports a Variable Bit Rate (VBR), a delay tolerance, connection oriented traffic for detecting a continuity and an error. Additionally, an AAL5 CP 68*d* performs a message recognition and time/clock restoration service, on the AAL5.

FIG. 5 illustrates the operation of the ATU-R 60 when the data packet is received from the Ethernet interface 61 according to the preferred embodiment of the present invention. For example but not by way of limitation, FIG. 5 illustrates a processing of data received from the Ethernet interface 61 in an operation state for processing externally-received data after the completion of initiation process.

The initiation process includes the subscriber terminal 50 allocating an internal IP address that is used between the subscriber terminal 50 and the ATU-R 60, and preparing a bridge mode operation without loading IP module 67.

In a first step S100, it is determined whether a data packet is received. If the data packet is received, a protocol of the data packet is analyzed in a second step S110. In a third step S120, it is determined whether the analyzed data packet is an Address Resolution Protocol (ARP) based data.

If the analyzed data packet is the ARP, in a fourth step S130, it is determined whether a destination address is the ATU-R address. In a fifth step S140, if the destination address is the ATU-R address, the ARP is performed corresponding to the received data. Otherwise, if the address recorded in the data packet is not the ATU-R address, the received data is deleted in a sixth step S150.

If the analyzed data packet is not an ARP, it is determined whether the analyzed data packet is a TCP/IP based data in a seventh step S160. If the analyzed data packet is the TCP/IP based data, it is determined whether a destination address is the ATU-R address in an eighth step S170.

If the destination address is the ATU-R address, the IP module is loaded for an execution in a ninth step S180. Then, a process corresponding to the packet information proceeds in a tenth step S190. For example but not by way of limitation, if a telnet service remote control information is in the data packet, a corresponding process in step S190 is performed and the result is provided to the subscriber terminal 50.

If the analyzed data packet is not the TCP/IP based data in the seventh step S160, or the destination address is not the ATU-R address in the eighth step S170, a bridge mode is performed in an eleventh step S200.

In the bridge mode process, the control unit 63 divides received data packet into the ATM cells, attaches header information to each cell, and transmits the cells through the ATM interface 62. If the first interface is not the Ethernet interface 61, data processing steps based on the ARP (i.e., steps S120 through S150) are omitted.

If the subscriber terminal 50 uses a Point to Point Over Ethernet (PPPOE) service using a variable IP, it is easier to set an internal IP address that identifies the modem between the subscriber terminal 50 and the modem 60 in a Local Area Network (LAN) as different from an Internet IP address than a fixed IP.

Even though the ADSL subscriber modem is an example of this preferred embodiment of the present invention, the present invention is not limited thereto and can also be applied to modems of other communication services. For example but not by way of limitation, the present invention can be applied to various modems defined according to a data transmission method or voice signal support (e.g, a Very high bit rate DSL (VSDL), a Symmetric DSL (SDSL), a High bit rate DSL (HDSL), and an Integrated Services Digital Network DSL (IDSL)).

The modem and the method of processing data according to the present invention has various advantages. For example but not by way of limitation, the present invention provides a response information of the modem through the subscriber terminal for the application services (e.g., embedded web or telnet) having a destination address that corresponds to the modem, by using TCP/IP, which is familiar to general users. When the communication service has problems, debugging of the modem by the embedded web or telnet, which are familiar to users, are supported, so that users can obtain status information of the modem by using control methods familiar to the user.

Although the preferred embodiments of the present invention have been described, it will be understood by those skilled in the art that the present invention should not be limited to the described preferred embodiment, but various changes and modifications can be made within the spirit and scope of the present invention as defined by the appended claims.

What is claimed is:

1. A modem, comprising:
a first interface for interfacing with a subscriber terminal;
a second interface for interfacing with a switching system;
a memory device in which a module is stored, for supporting various communication protocols; and
a control unit for processing bidirectional data communication between the subscriber terminal and the switching system, the control unit comprising:
a mode selecting part for reading a data packet received from the first interface, and loading an Internet Protocol module on an execute protocol stack for processing the received data packet if a destination address recorded in said data packet is an address of the modem and unloading the Internet Protocol module if the destination address recorded in said data packet is not an address of the modem; and
a data processing part for processing data corresponding to the data packet received from the loaded protocol module on the protocol stack according to a mode determined by the mode selecting part.

2. The modem as claimed in claim 1, wherein the first interface is an Ethernet interface, and the mode selecting part loads the Internet Protocol module on the protocol stack, when the Internet Protocol address of the modem used in an internal network between the subscriber terminal and the modem is recorded in the data packet which is received from the Ethernet interface, and when an information is requested for a Transmission Control Protocol/Internet Protocol based application, which can be supported by the modem.

3. The modem as claimed in claim 2, wherein the mode selecting part unloads the Internet Protocol module for allowing a bridge mode operation.

4. The modem as claimed in claim 2, wherein the modem is an Asymmetric Digital Subscriber Line modem.

5. The modem as claimed in claim 2, wherein the information requesting the Transmission Control Protocol/Internet Protocol based application service includes at least one service among a telnet, an embedded web, a file transfer protocol (ftp), a trivial file transfer protocol (tftp), and a ping.

6. A method of processing data in a modem installed between a subscriber terminal and a switching system comprising the steps of:

i) analyzing a data packet received from the subscriber terminal;

ii) loading an Internet Protocol module on an execute protocol stack for processing received data packet, when an Internet Protocol address of the modem used in an internal network between the modem and the subscriber terminal is recorded in the data packet, and when an information is requested for a Transmission Control Protocol/Internet Protocol based application service;

iii) processing the data packet information with a support of the Internet Protocol module; and iv) transforming the data packet to a format required by the switching system and transmitting the data packet through a second interface in a bridge mode in which the Internet Protocol module is unloaded on the protocol stack, when an Internet Protocol address of the modem used in the internal network between the subscriber terminal and the modem is not recorded in the data packet.

7. The method of claim 6, further comprising processing an Address Resolution Protocol (ARP) when said analyzed data packet is an ARP that comprises an ADSL Terminal Unit-Remote (ATU-R) address.

* * * * *